United States Patent
Chen et al.

(10) Patent No.: US 11,060,500 B2
(45) Date of Patent: Jul. 13, 2021

(54) DUCTED BIDIRECTIONAL TIDAL CURRENT POWER STATION SYSTEM

(71) Applicant: Hangzhou Jianghe Hydro-Electrical Science& Technology Co., Ltd., Zhejiang (CN)

(72) Inventors: Liwei Chen, Zhejiang (CN); Changlu Liu, Zhejiang (CN); Jianfeng Yu, Zhejiang (CN); Dongli Zhang, Zhejiang (CN); Yinhua Chen, Zhejiang (CN); Qianqian Li, Zhejiang (CN); Yujuan Wang, Zhejiang (CN); Jinbo Hu, Zhejiang (CN)

(73) Assignee: HangZhou JiangHe Hydro-Electrical Sci. & Tech. Co., Hangzhou (CN)

( * ) Notice: Subject to any disclaimer, the term of this patent is extended or adjusted under 35 U.S.C. 154(b) by 125 days.

(21) Appl. No.: 16/558,001

(22) Filed: Aug. 30, 2019

(65) Prior Publication Data
US 2020/0132041 A1     Apr. 30, 2020

(51) Int. Cl.
*F03B 13/26*     (2006.01)
*F03D 1/06*      (2006.01)
*F03D 9/25*      (2016.01)

(52) U.S. Cl.
CPC ............. *F03B 13/26* (2013.01); *F03D 1/065* (2013.01); *F03D 9/25* (2016.05)

(58) Field of Classification Search
CPC ...... F03B 13/26; F03B 13/105; F03B 13/264; F03B 13/268; F03D 1/065; F03D 9/25; Y02E 10/30; F05B 2210/404

USPC .......................... 290/42, 43, 53, 54
See application file for complete search history.

(56) References Cited

U.S. PATENT DOCUMENTS

| 3,426,540 | A | * | 2/1969 | Fixel | .......................... E02B 9/08 |
| | | | | | 405/77 |
| 4,421,990 | A | * | 12/1983 | Heuss | .................... F03B 13/268 |
| | | | | | 290/53 |
| 9,003,785 | B2 | * | 4/2015 | Toulouse | ........... B01D 19/0036 |
| | | | | | 60/398 |

(Continued)

FOREIGN PATENT DOCUMENTS

| CN | 103742334 B | 2/2016 |
| CN | 103982367 B | 4/2016 |

(Continued)

*Primary Examiner* — Charles Reid, Jr.

(57) ABSTRACT

The present invention discloses a ducted bidirectional tidal current power station system, mainly consisting of a bidirectional tidal current power generation device, a dam, an open sea, an inland sea, a duct, and an opening/closing gate. The bidirectional tidal current power generation device is installed in the duct on the bottom of the dam. Openings, respectively communicated with the open sea and the inland sea, are formed at two ends of the duct, and an opening/closing gate is arranged at each of the two openings. By the ducted bidirectional tidal current power station system of the present invention, the cost of marine construction, operation and maintenance of the tidal current power generation device in an open sea area is saved, and the complex structure of the power generation device in the tidal power station and the cost of strict construction of auxiliary devices and runners are avoided.

5 Claims, 8 Drawing Sheets

(56) References Cited

U.S. PATENT DOCUMENTS

| | | | | |
|---|---|---|---|---|
| 2005/0285407 A1* | 12/2005 | Davis | ............... | F03B 13/083 |
| | | | | 290/54 |
| 2010/0207393 A1* | 8/2010 | Roberts | ............... | F03B 13/22 |
| | | | | 290/54 |
| 2010/0289267 A1* | 11/2010 | Jang | ............... | F03B 17/062 |
| | | | | 290/53 |
| 2010/0327594 A1* | 12/2010 | Jang | ............... | F03B 13/268 |
| | | | | 290/53 |
| 2011/0089702 A1* | 4/2011 | Boren | ............... | F03B 17/063 |
| | | | | 290/55 |
| 2011/0309624 A1* | 12/2011 | Ettanoor Thuppale | ............... | |
| | | | | F03B 13/264 |
| | | | | 290/54 |
| 2012/0019004 A1* | 1/2012 | Ekern | ............... | F03B 13/264 |
| | | | | 290/53 |
| 2013/0069369 A1* | 3/2013 | Salehpoor | ............... | F03B 13/264 |
| | | | | 290/53 |
| 2014/0246859 A1* | 9/2014 | Obermeyer | ............... | F03B 11/004 |
| | | | | 290/54 |
| 2016/0017860 A1* | 1/2016 | Smith | ............... | F03B 13/264 |
| | | | | 290/53 |
| 2018/0069404 A1* | 3/2018 | Schult | ............... | H02M 7/125 |

FOREIGN PATENT DOCUMENTS

| | | |
|---|---|---|
| CN | 103742351 B | 5/2016 |
| CN | 101109364 A | 1/2018 |

* cited by examiner

DUCTED BIDIRECTIONAL TIDAL CURRENT POWER STATION SYSTEM

CROSS-REFERENCE TO RELATED APPLICATIONS

This application claims the benefit of priority from Chinese Patent Application No. CN201811276427.9, filed on Oct. 30, 2018. The content of the aforementioned application, including any intervening amendments thereto, is incorporated herein by reference in its entirety.

TECHNICAL FIELD

The present invention relates to the technical field of development and utilization of tidal current energy from oceans, and in particular to a tidal current power station system in which the bidirectional tidal current power generation device is installed in the duct.

BACKGROUND OF THE PRESENT INVENTION

Tidal energy from oceans is green and inexhaustible. At present, there are two ways to utilize tidal energy from oceans for power generation. One way is to install a tidal current power generation device in an open sea area to capture kinetic energy of seawater generated by tidal movement for power generation. At this stage, in China, great effort is paid on the industrial application of tidal current power generation equipment. It is hoped that the tidal energy can be utilized efficiently and on a large scale. The other way is to build a dam and build a tidal power station in a suitable harbor, and use the water level difference potential energy generated by tidal movements on both sides of the dam for power generation. Up to 40 tidal power stations have been built in China since 1957.

There are many types of tidal energy power generation devices, but with low energy-capturing efficiency. Because the device is installed offshore or even in the open sea, the marine construction, operation and maintenance is costly and difficult, and the cost performance is low. The power generation device in the tidal power station is arranged in the flow path of the dam, with high energy-capturing efficiency and simple installation and maintenance. However, as a very low-head hydro-generator unit, the power generation device has disadvantages of complex structure, many auxiliary devices, high requirements for plant and flow path construction and low cost performance.

SUMMARY OF THE PRESENT INVENTION

In view of the deficiencies in existing technology, an objective of the present invention is to provide a ducted bidirectional tidal current power station system. A bidirectional tidal current power generation device is installed in a duct of a natural or artificial dam. In this way, the cost of marine construction, operation and maintenance of the tidal current power generation device in an open sea area is saved, and the complex structure of the power generation device in the tidal power station and the cost of strict construction of auxiliary devices, plants and flow path are avoided. The energy-capturing efficiency is between the above two cases. The cost performance of utilization of tidal energy from oceans is improved significantly.

For this purpose, the present invention employs the following technical solutions:

A ducted bidirectional tidal current power station system is provided, mainly consisting of a bidirectional tidal current power generation device, a dam, an open sea, an inland sea, a duct, and an opening/closing gate; the bidirectional tidal current power generation device is installed in the duct on the bottom of the dam; and openings, respectively communicated with the open sea and the inland sea, are formed at two ends of the duct, and an opening/closing gate is arranged at each of the two openings.

Further, one bidirectional tidal current power generation device is installed in the duct, or two or more bidirectional tidal current power generation devices are installed side by side in a direction perpendicular to a tidal current; and, when the number of bidirectional tidal current power generation devices is greater than or equal to 2, in order to reduce the mutual influence between flow patterns of tidal currents, the bidirectional tidal current power generation devices pairwise run and rotate in opposite directions.

Further, the bidirectional tidal current power generation device comprises an impeller, a rotor, a stator, a rear guide base, a front guide base, a cylindrical roller, a thrust roller and an electrical control system; the impeller is arranged on a periphery of the rotor; the rotor, as a shaftless structure, is rotatably installed between the front guide base and the rear guide base by the cylindrical roller and the thrust roller; the front guide base and the rear guide base are fixedly installed in the duct; radial loads and axial loads generated by the impeller and the rotor are transferred to the front guide base and the rear guide base by the cylindrical roller and the thrust roller; and the stator is installed between the front guide base and the rear guide base and located inside the rotor.

Still further, the electrical control system comprises a master controller, a current transformer, a power generator side switch, and a power grid side switch; each of the current transformer, the power generator side switch and the power grid side switch is connected to the master controller; each of the power generator side switch and the power grid side switch is connected to the current transformer; and, the power generator side switch is connected to a leading out wire of the stator of the bidirectional tidal current power generation device, and the power generation grid side switch is connected to a power grid.

Still further, the electrical control system further comprises a Hall sensor, a frequency converter, an electrically-driving grid side switch and an electromotor side switch; each of the frequency converter, the electrically-driving grid side switch and the electromotor side switch is connected to the master controller; the Hall sensor is connected to the frequency converter; each of the electrically-driving grid side switch and the electromotor side switch is connected to the frequency converter; and, the electromotor side switch is connected to the stator leading our wire of the bidirectional tidal-current power generation device, and the electrically-driving grid side switch is connected to the power grid.

An operation method for a ducted bidirectional tidal current power station system described above is provided, specifically:

the opening/closing gate is normally open, a forward water level difference is formed when the tidal level of the open sea is higher than that of the inland sea, so that seawater flows into the inland sea from the open sea via the duct to form a forward tidal current, and the bidirectional tidal current power generation device captures kinetic energy of the forward tidal current for power generation to output electric energy; and as time passes and tidal movement changes, when the tidal level of the open sea is equal to that of the inland sea, the water level difference becomes zero, the flow velocity of seawater in the duct becomes zero, and the bidirectional tidal current power generation device is kept in the original rotation direction for transient inertial rotation; and a backward water level difference is formed when the tidal level of the open sea is lower than that of the inland sea, so that seawater flows into the open sea from the inland sea via the duct to form a backward tidal current, and the bidirectional tidal current power generation device automatically changes the pitch angleto capture kinetic energy of the backward tidal current for power generation to output electric energy; and as time passes and tidal movement changes, when the tidal level of the open sea becomes equal to that of the inland sea again, the water level difference becomes zero, the flow velocity of seawater in the duct becomes zero, and the bidirectional tidal current power generation device is kept in the original rotation direction for transient inertial rotation.

Further, the process of capturing kinetic energy of the forward tidal current or backward tidal current by the bidirectional tidal current power generation device is as follows:

When there is tidal current in the duct, the impeller rotates by capturing kinetic energy of the forward tidal current or backward tidal current; this rotation drives the rotor to generate a rotary magnetic field; the electromagnetic induced voltage and current are generated in windings of the stator, and the stator is successively connected to the power grid via the power generator side switch, the current transformer and the power grid side switch to output electric energy; and the bidirectional tidal current power generation device runs for power generation.

Still further, when there is no tidal current velocity in the duct, the stator is successively connected to the power grid via the electrically-driving grid side switch, the frequency converter and the electromotor side switch to absorb the electric energy to generate an alternating magnetic field that interacts with the magnetic field generated by the rotor to drive the rotor to rotate; the rotor further drives the impeller to rotate; and the bidirectional tidal current power generation device runs as an electric water pump.

The present invention has the following beneficial effects.

The present invention provides a ducted bidirectional tidal current power station system by which, the cost of marine construction, operation and maintenance of the tidal current power generation device in an open sea area is saved, and the complex structure of the power generation device in the tidal power station and the cost of strict construction of auxiliary devices and flow paths are avoided. The cost performance of utilization of tidal energy from oceans is improved significantly. Meanwhile, the tidal current power generation device has the function of electric water pump. In addition, the ducted bidirectional tidal current power station system controls the water level in the inland sea by the opening/closing gate. The ducted bidirectional tidal current power station system may operate in various ways, if desired. The utilization efficiency of tidal current energy is improved.

DETAILED DESCRIPTION OF THE PRESENT INVENTION

The present invention will be further described with reference to the accompanying drawings. It is to be noted that detailed implementations and specific operating processes are given in this embodiment, on the premise of this technical solution. However, the protection scope of the present invention is not limited to this embodiment.

Figure 1:
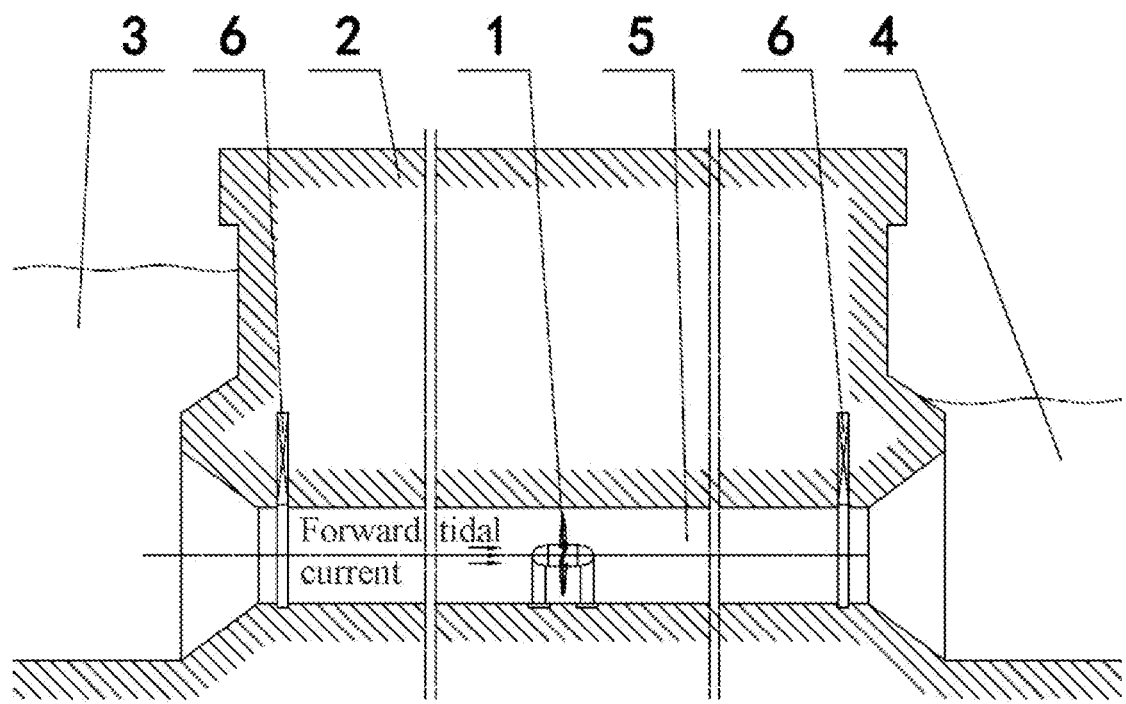
FIG. 1 is a schematic view of power generation by using a forward tidal current in an embodiment of the present invention.
Figure 2:
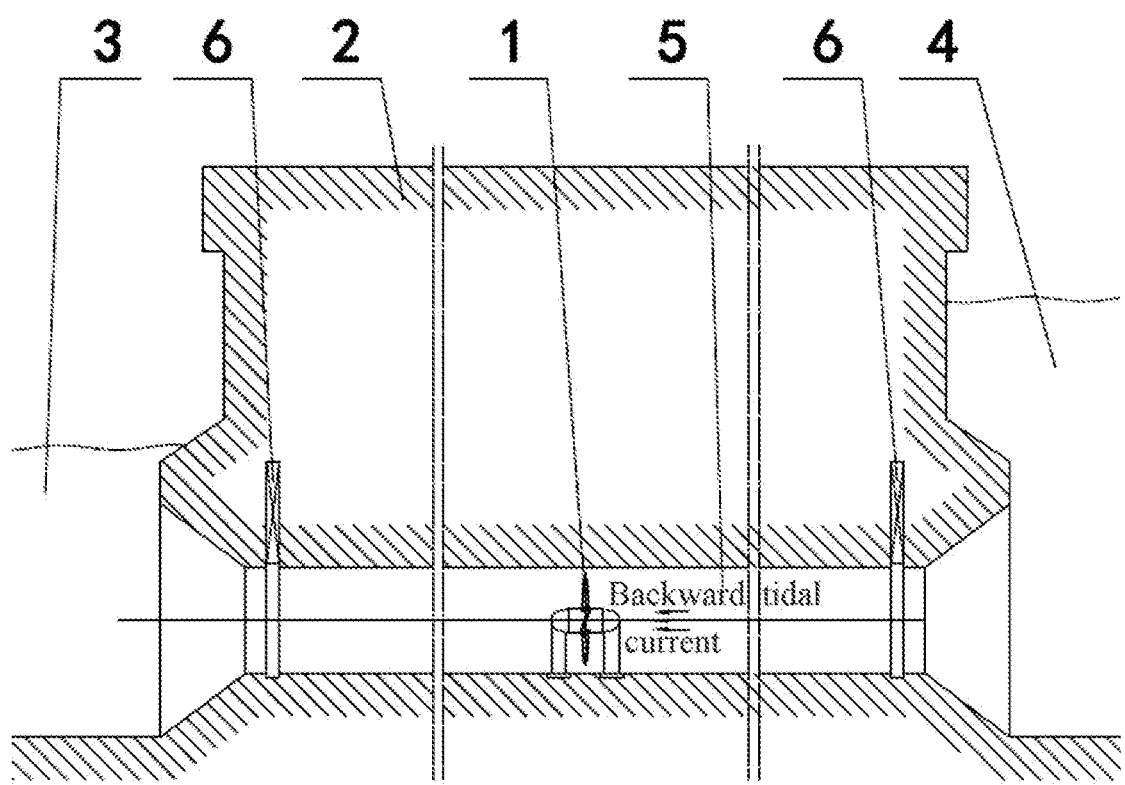
FIG. 2 is a schematic view of power generation by using a backward tidal current in an embodiment of the present invention.

As shown in FIGS. 1-2, the present invention discloses a ducted bidirectional tidal current power station system, mainly consisting of a bidirectional tidal current power generation device 1, a dam 2, an open sea 3, an inland sea 4, a duct 5, and an opening/closing gate 6. The bidirectional tidal current power generation device 1 is mounted in the duct 5 on the bottom of the dam 2. Openings, respectively communicated with the open sea 3 and the inland sea 4, are formed at two ends of the duct 5, and an opening/closing gate 6 is arranged at each of the two openings.

When in operation, when the tidal level of the open sea 3 changes due to the tidal movement, a water level difference is formed with the tidal level of the inland sea 4 on the other side of the dam 2. There is seawater flow in the duct 5. A forward tidal current or a backward tidal current is formed. Then, the bidirectional tidal current power generation device 1 captures the kinetic energy of the forward tidal current or backward tidal current for forward power generation or backward power generation to output electric energy.

Figure 3:
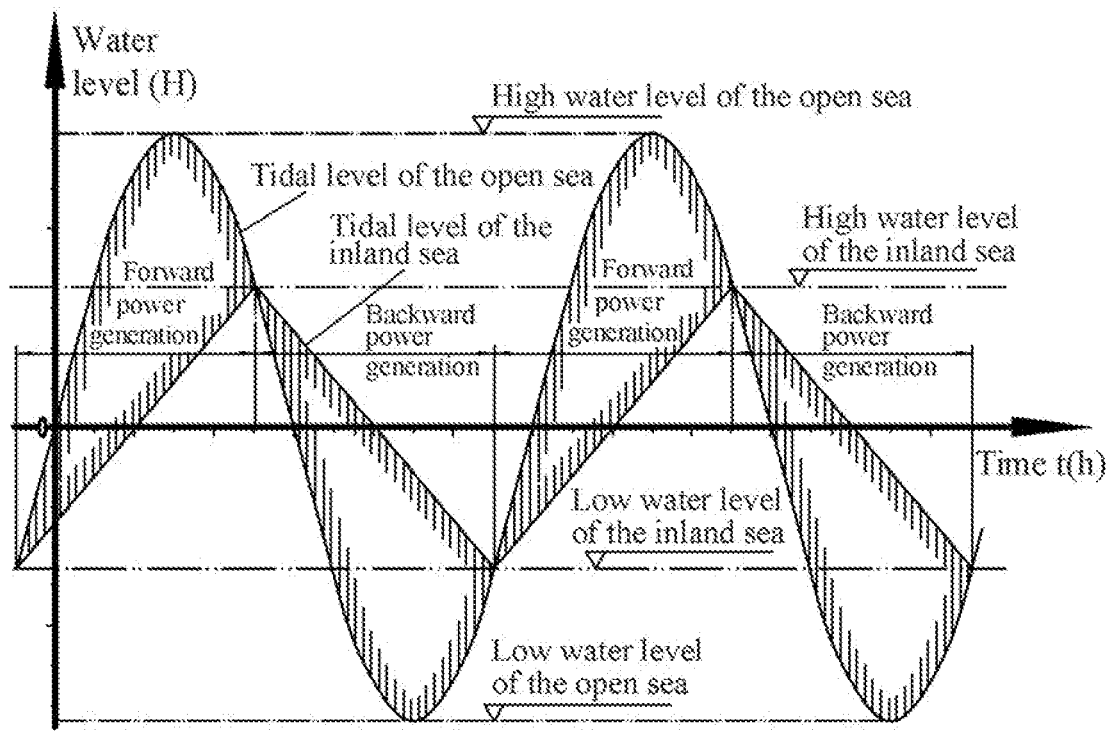
FIG. 3 is a schematic view showing the periodic change in the tidal level of the open sea and the inland sea, in an embodiment of the present invention.
Figure 4:
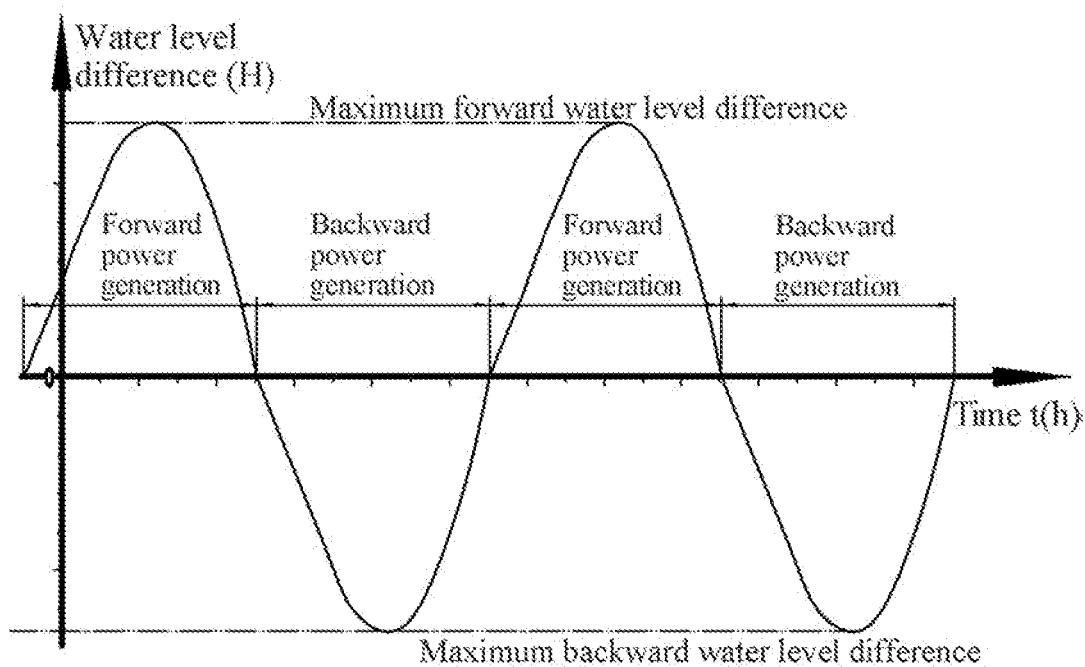
FIG. 4 is a schematic view showing the periodic change in the water level of the open sea and the inland sea, in an embodiment of the present invention.
Figure 5:
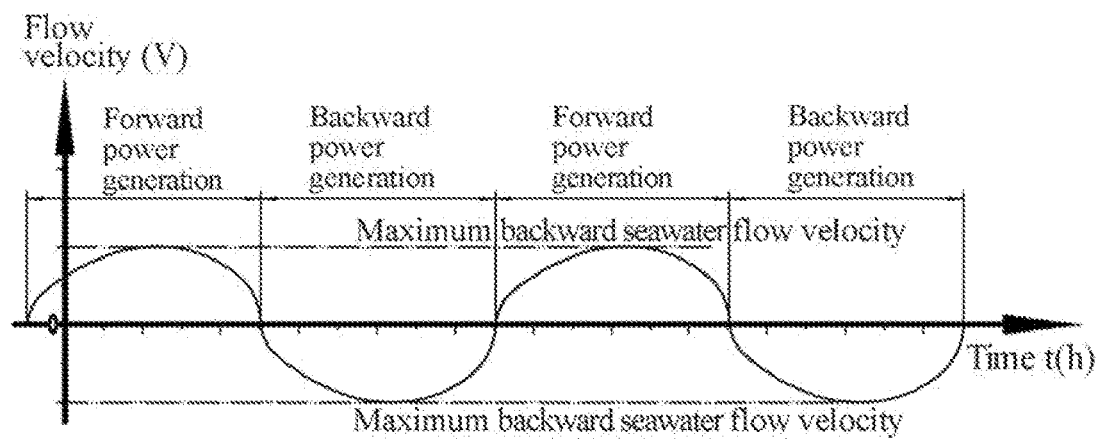
FIG. 5 is a schematic view showing the periodic change in the flow velocity of the tidal current in the duct, in an embodiment of the present invention.
Figure 6:
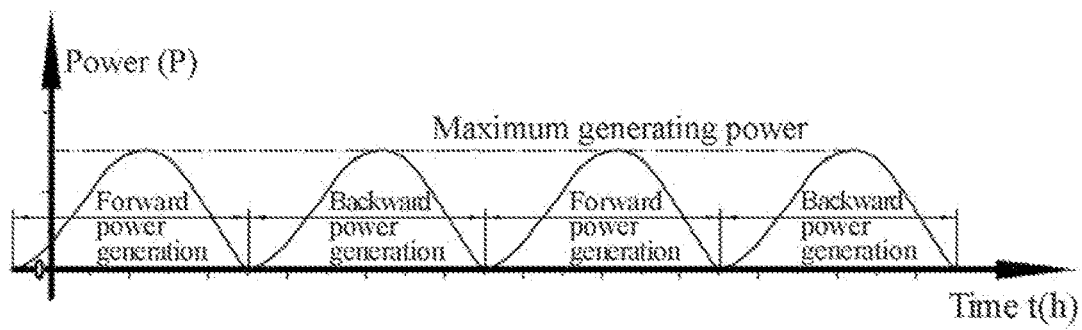
FIG. 6 is a schematic view showing the periodic change in the output power of the tidal current power generation device, in an embodiment of the present invention.

As shown in FIGS. 3-5, the tidal movement leads to sinusoidal change in the tidal level of the open sea 3. The opening/closing gate 6 is normally open. A forward water level difference is formed when the tidal level of the open sea 3 is higher than that of the inland sea 4, so that seawater flows into the inland sea 4 from the open sea 3 via the duct 5 to form a forward tidal current, and the bidirectional tidal current power generation device 1 captures kinetic energy of the forward tidal current for power generation to output electric energy. As time passes and tidal movement changes, when the tidal level of the open sea 3 is equal to that of the inland sea 4, the water level difference becomes zero, the flow velocity of seawater in the duct 5 becomes zero, and the bidirectional tidal current power generation device 1 is kept in the original rotation direction for transient inertial rotation. Extremely little electric energy is output. As time passes and tidal movement changes, a backward water level difference is formed when the tidal level of the open sea 3 is lower than that of the inland sea 4, so that seawater flows into the open sea 3 from the inland sea 4 via the duct 5 to form a backward tidal current, and the bidirectional tidal current power generation device 1 automatically changes the pitch angle, in order to keep the original rotation direction to continuously capture kinetic energy of the backward tidal current for power generation to output electric energy. As time passes and tidal movement changes, when the tidal level of the open sea 3 becomes equal to that of the inland sea 4 again, the water level difference becomes zero, the flow velocity of seawater in the duct 5 becomes zero, and the bidirectional tidal current power generation device 1 is kept in the original rotation direction for transient inertial rotation. Extremely little electric energy is output. Then, the bidirectional tidal current power generation device 1 captures the forward tidal current for power generation. It operates in this way again and again.

Figure 7:
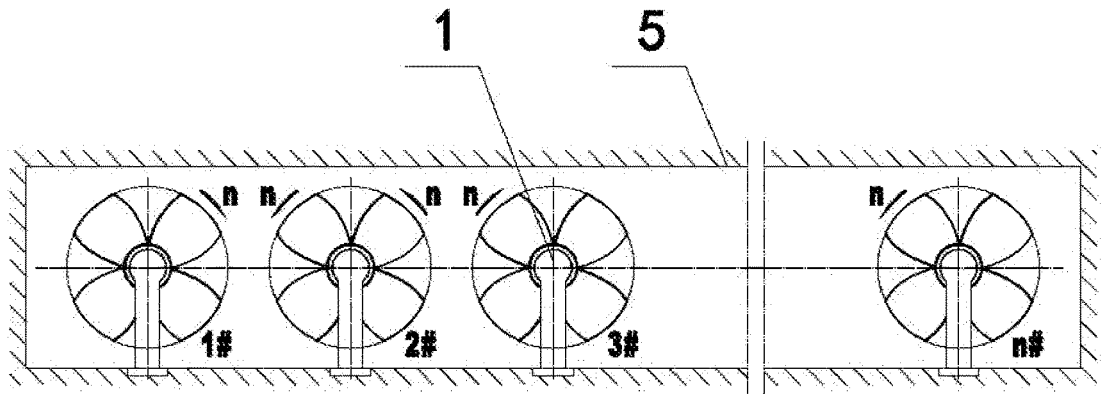
FIG. 7 is a cross-sectional view of the arrangement of the tidal current power generation device in the duct, in an embodiment of the present invention.
Figure 8:
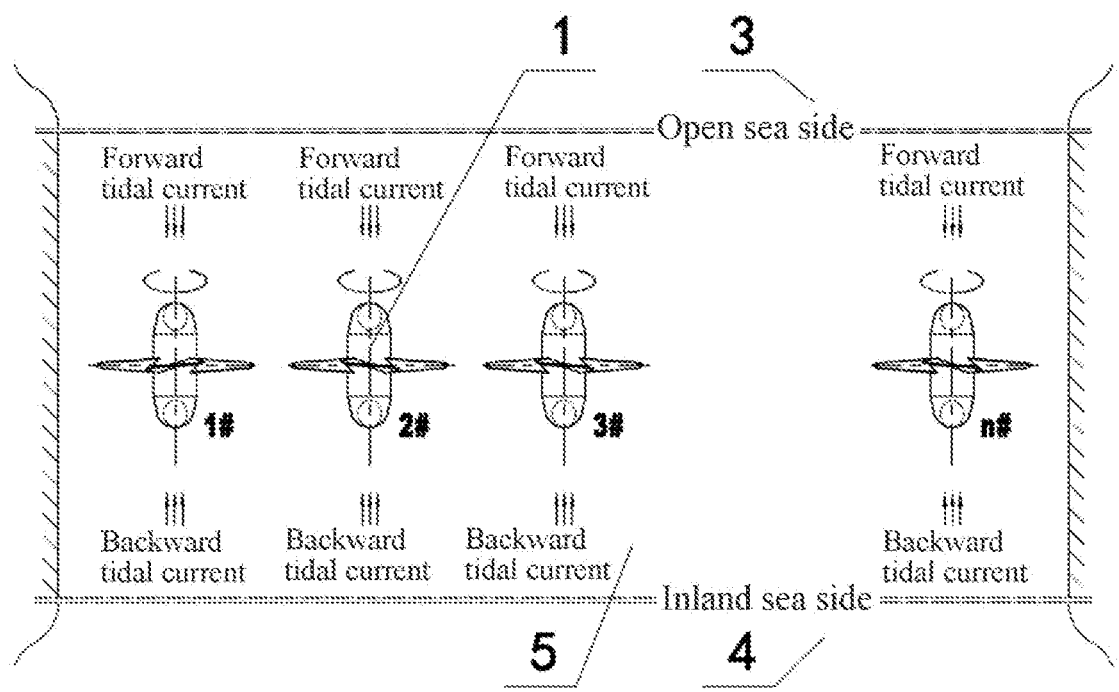
FIG. 8 is a top view of the arrangement of the tidal current power generation device in the duct, in an embodiment of the present invention.

As shown in FIGS. 7 and 8, one bidirectional tidal current power generation device may be installed in the duct 5, or two or more bidirectional tidal current power generation devices may be installed side by side in a direction perpendicular to a tidal current; and, when the number of bidirectional tidal current power generation devices 1 is greater than 2, in order to reduce the mutual influence between flow patterns of tidal currents, the bidirectional tidal current power generation devices 1 pairwise run and rotate in opposite directions.

Figure 9:
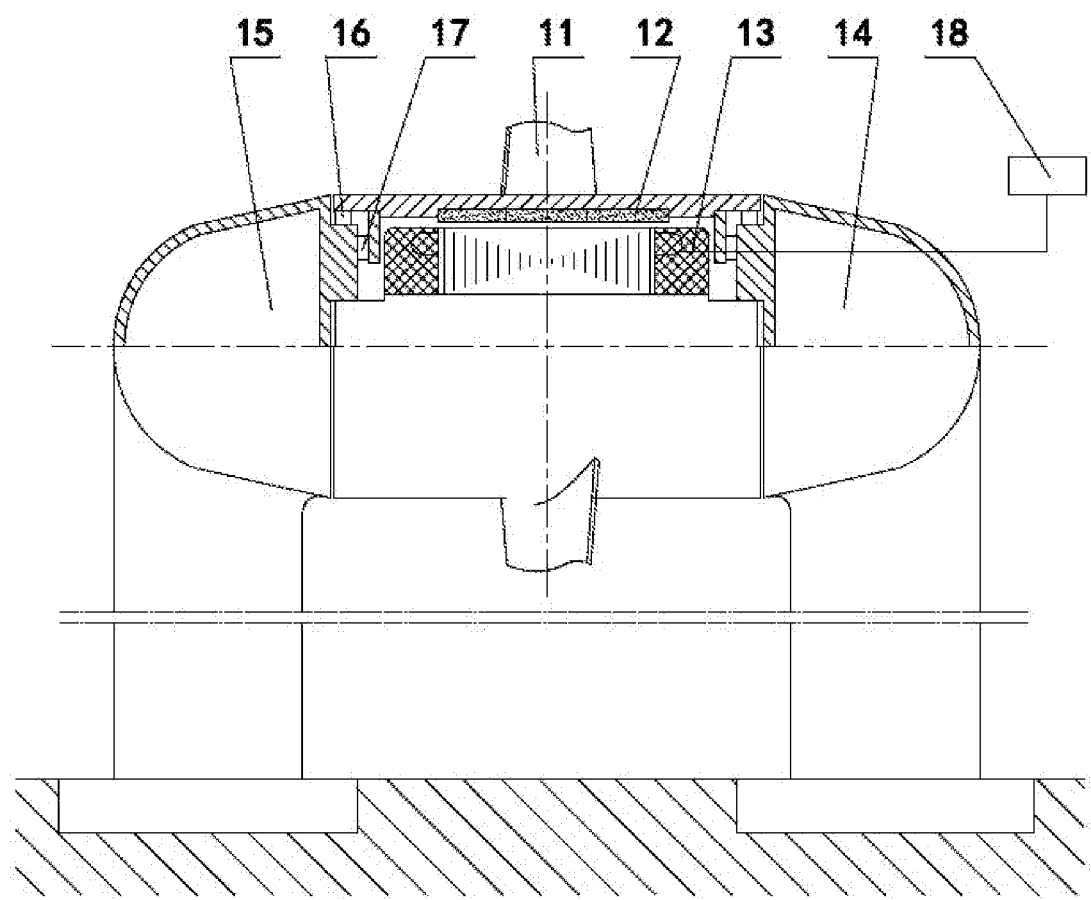
FIG. 9 is a sectional view of a bidirectional tidal current power generation device in an embodiment of the present invention.

As shown in FIG. 9, the bidirectional tidal current power generation device 1 comprises an impeller 11, a rotor 12, a stator 13, a rear guide base 14, a front guide base 15, a cylindrical roller 16, a thrust roller 17 and an electrical control system 18. The impeller 11 is arranged on a periphery of the rotor 12. The rotor 12, as a shaftless structure, is rotatably installed between the front guide base 15 and the rear guide base 14 by the cylindrical roller 16 and the thrust roller 17. The front guide base 15 and the rear guide base 14 are fixedly installed in the duct 5. Radial loads and axial loads generated by the impeller 11 and the rotor 12 are transferred to the front guide base 15 and the rear guide base 14 by the cylindrical roller 16 and the thrust roller 17. The stator 13 is installed between the front guide base 15 and the rear guide base 14 and located inside the rotor 12.

Figure 10:
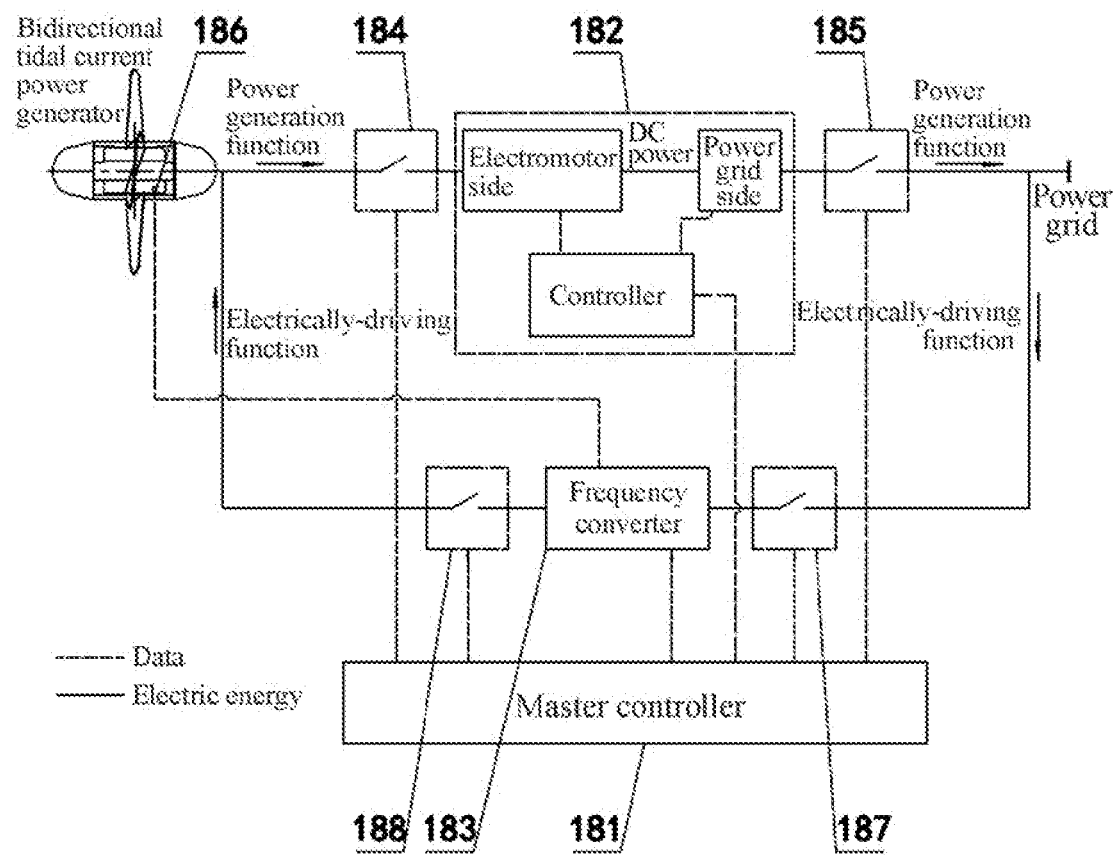
FIG. 10 is a diagram of an electrical system of the tidal current power generation device in an embodiment of the present invention.

As shown in FIG. 10, the electrical control system 18 comprises a master controller 181, a current transformer 182, a frequency converter 183, a power generator side switch 184, a power grid side switch 185, a Hall sensor 186, an electrically-driving grid side switch 187 and an electromotor side switch 188. Each of the current transformer 182, the frequency converter 183, the power generator side switch 184, the power generation grid side switch 185, the electrically-driving grid side switch 187 and the electromotor side switch 188 is connected to the master controller 181 by a communication cable. The Hall sensor 186 is arranged in a core slot of the stator 13 and connected to the frequency converter 183 by a communication cable. Each of the electrically-driving grid side switch 187 and the electromotor side switch 188 is connected to the frequency converter 183 by a power cable. Each of the power generator side switch 184 and the power grid side switch 185 is connected to the current transformer 182 by a power cable. The power generator side switch 184 is connected to leading out wire of the stator 13 of the bidirectional tidal current power generation device 1 by a power cable, and the power grid side switch 185 is connected to a power grid. The electromotor side switch 188 is connected to the leading out wire of the stator 13 of the bidirectional tidal current power generation device 1 by a power cable, and the electrically-driving grid side switch 187 is connected to the power grid by a power cable.

As shown in FIGS. 1-2 and FIGS. 9-10, when there is tidal current in the duct 5, the impeller 11 rotates by capturing kinetic energy of the forward tidal current or backward tidal current; this rotation drives the rotor 12 to generate a rotary magnetic field; an electromagnetic induced voltage and current is generated in windings of the stator 13, and the stator 13 is connected to the power grid via the power generator side switch 184, the current transformer 182 and the power generation grid side switch 185 to output electric energy; and the bidirectional tidal current power generation device 1 runs for power generation. When there is no tidal current velocity in the duct 5, the stator 13 is connected to the power grid via the electrically-driving grid side switch 187, the frequency converter 183 and the electromotor side switch 188 to absorb the electric energy to generate an alternating magnetic field that interacts with the magnetic field generated by the rotor 12 to drive the rotor to rotate; the rotor further drives the impeller to rotate; and the bidirectional tidal current power generation device 1 operates as an electric water pump.

As shown in FIG. 10, when the bidirectional tidal current power generation device 1 operates for power generation, the master controller 181 sends a running-for-power-generation instruction, the electrically-driving grid side switch 187 and the electromotor side switch 188 are turned off, and the frequency converter 183 stops operating; the power generator side switch 184 is turned on, and the current transformer 182 rectifies and inverses the electric energy output by the bidirectional tidal current power generation device 1 into power-frequency electric energy; an output electric energy signal is compared with a power grid electric energy signal, and when the grid-connection conditions are satisfied, the power generation grid side switch 185 is turned on, and the bidirectional tidal current power generation device 1 outputs electric energy to the power grid.

When the bidirectional tidal current power generation device 1 operates as an electric water pump, the master controller 181 sends a running-as-electric-water-pump instruction, the power generator side switch 184 and the power generation grid side switch 185 are turned off, and the current transformer 182 stops operating; the electrically-driving grid side switch 187 and the electromotor side switch 188 are turned on, the Hall sensor 186 feeds position and rotation speed signals back to the frequency converter 183, and the frequency converter 183 provides variable-frequency power starting and drives the tidal current power generation device 1 to run as an electric water pump.

Figure 11:
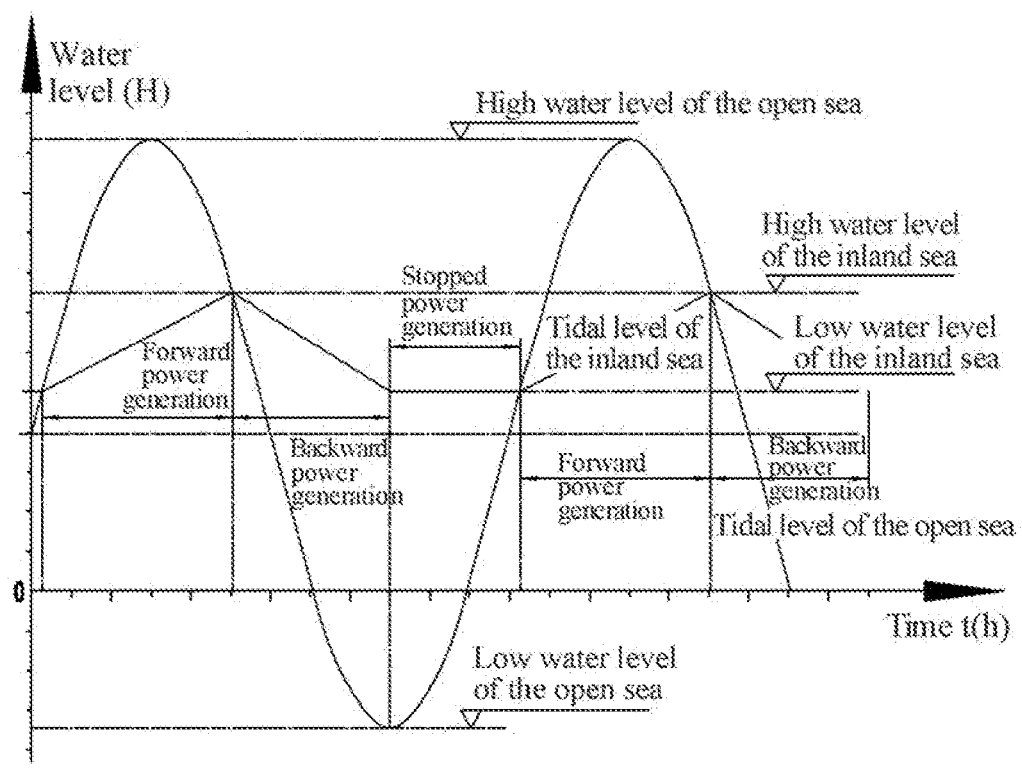
FIG. 11 is a schematic view of controlling the inland sea in a lower water level, in an embodiment of the present invention.
Figure 12:
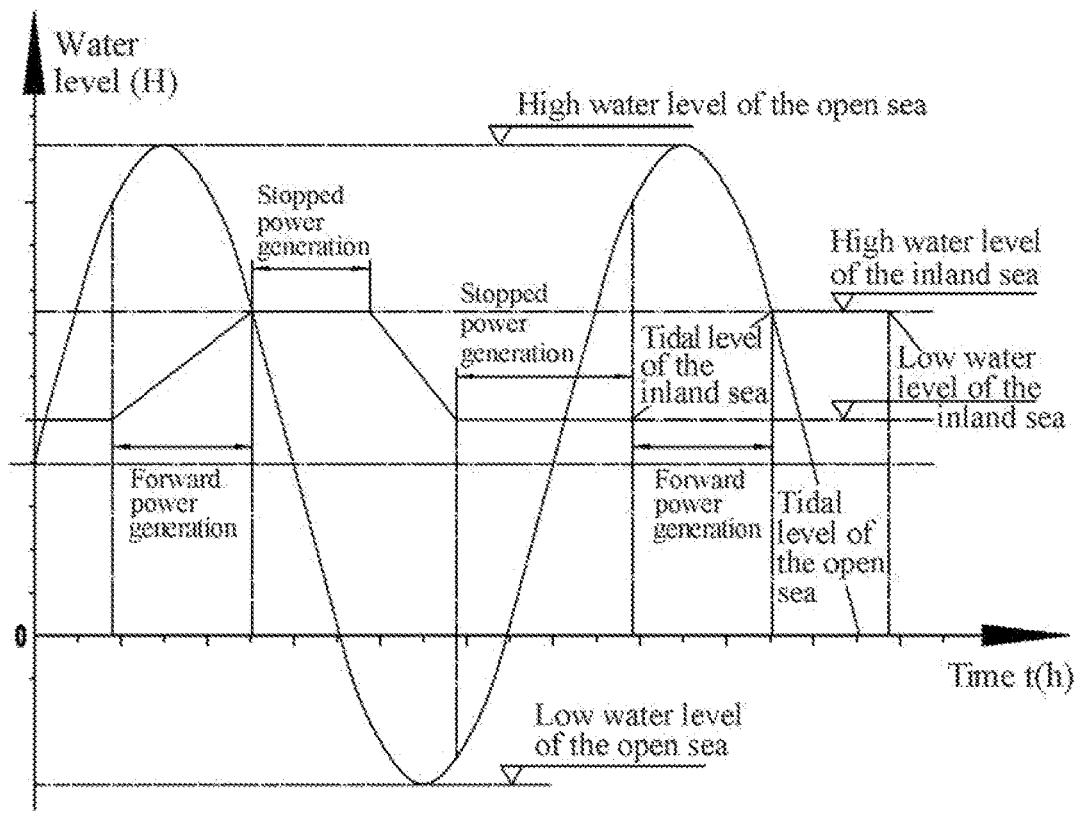
FIG. 12 is a schematic view of controlling the inland sea in a high water level and in a lower water level, in an embodiment of the present invention.

As shown in FIGS. 11-12, to change in the water level of the inland sea 4 by closing the opening/closing gate 6, the ducted bidirectional tidal current power station system can run in various ways. For example, as shown in FIG. 11, when the water level of the inland sea 4 is higher than that of the open sea 3 and the bidirectional tidal current power generation device 1 operates for backward power generation, in order to ensure the lowest water level requirement of the inland sea 4, the opening/closing gate 6 should be closed. The bidirectional tidal current power generation device 1 stops power generation. The tidal current power generation station system forms a cyclic operation of forward power generation, backward power generation and stopped power generation. Further, for example, as shown in FIG. 12, in order to ensure the highest water level requirement and the lowest water level requirement of the inland sea 4, the opening/closing gate 6 should be closed when the bidirectional tidal current power generation device 1 operates for forward power generation and backward power generation. The bidirectional tidal current power generation device 1 stops power generation. The tidal current power generation station system forms a cyclic operation of forward power generation, stopped power generation, backward power generation and stopped power generation.

For a person of ordinary skill in the art, various corresponding changes and variations may be obtained according to the technical solutions and concepts described above. All those changes and variations shall be included in the protection scope defined by the claims of the present invention.

What is claimed is:

1. A ducted bidirectional tidal current power station system, mainly consisting of a bidirectional tidal current power generation device, a dam, an open sea, an inland sea, a duct, and an opening/closing gate; wherein the bidirectional tidal current power generation device is installed in the duct on the bottom of the dam; and openings, respectively communicated with the open sea and the inland sea, are formed at two ends of the duct, and an opening/closing gate is arranged at each of the two openings;

wherein the bidirectional tidal current power generation device comprises an impeller, a rotor, a stator, a rear guide base, a front guide base, a cylindrical roller, a thrust roller and an electrical control system; the impeller is arranged on a periphery of the rotor; the rotor, as a shaftless structure, is rotatably installed between the front guide base and the rear guide base by the cylindrical roller and the thrust roller; the front guide base and the rear guide base are fixedly installed in the duct radial loads and axial loads generated by the impeller and the rotor are transferred to the front guide base and the rear guide base by the cylindrical roller and the thrust roller; and the stator is installed between the front guide base and the rear guide base and located inside the rotor;

the electrical control system comprises a master controller, a current transformer, a power generator side switch, and a power grid side switch; each of the current transformer, the power generator side switch and the power grid side switch is connected to the master controller; each of the power generator side switch and the power grid side switch is connected to the current transformer; and, the power generator side switch is connected to a leading out wire of the stator of the bidirectional tidal current power generation device, and the power grid side switch is connected to a power grid; and the electrical control system further comprises a Hall sensor, a frequency converter, an electrically-driving grid side switch and an electromotor side switch; each of the frequency converter, the electrically-driving grid side switch and the electromotor side switch is connected to the master controller; the Hall sensor is connected to the frequency converter; each of the electrically-driving grid side switch and the electromotor side switch is connected to the frequency converter; and, the electromotor side switch is connected to the leading out wire of the stator of the bidirectional tidal current power generation device, and the electrically-driving grid side switch is connected to the power grid.

2. The ducted bidirectional tidal current power station system according to claim 1, wherein the bidirectional tidal current power generation device is installed in the duct, or two or more bidirectional tidal current power generation devices are installed side by side in a direction perpendicular to a tidal current; and, when the number of bidirectional tidal current power generation devices is greater than or equal to 2, in order to reduce the mutual influence between flow patterns of tidal currents, the bidirectional tidal current power generation devices pairwise run and rotate in opposite directions.

3. An operation method for a ducted bidirectional tidal current power station system according to claim 1, wherein, specifically:

the opening/closing gate is normally open, a forward water level difference is formed when the tidal level of the open sea is higher than that of the inland sea, so that seawater flows into the inland sea from the open sea via the duct to form a forward tidal current, and the bidirectional tidal current power generation device captures kinetic energy of the forward tidal current for power generation to output electric energy; and as time passes and tidal movement changes, when the tidal level of the open sea is equal to that of the inland sea, the water level difference becomes zero, the flow velocity of seawater in the duct becomes zero, and the bidirectional tidal current power generation device is kept in the original rotation direction for transient inertial rotation; and a backward water level difference is formed when the tidal level of the open sea is lower than that of the inland sea, so that seawater flows into the open sea from the inland sea via the duct to form a backward tidal current, and the bidirectional tidal current power generation device automatically changes the pitch angle to capture kinetic energy of the backward tidal current for power generation to output electric energy; and as time passes and tidal movement changes, when the tidal level of the open sea becomes equal to that of the inland sea again, the water level difference becomes zero, the flow velocity of seawater in the duct becomes zero, and the bidirectional tidal current power generation device is kept in the original rotation direction for transient inertial rotation.

4. The operation method according to claim 3, wherein the process of capturing kinetic energy of the forward tidal current or backward tidal current by the bidirectional tidal current power generation device is as follows:

when there is a tidal current in the duct, the impeller rotates by capturing kinetic energy of the forward tidal current or backward tidal current; this rotation drives the rotor to generate a rotary magnetic field; an electromagnetic induced voltage and current is generated in windings of the stator, and the stator is successively connected to the power grid via the power generator side switch, the current transformer and the power generation grid side switch to output electric energy; and the bidirectional tidal current power generation device runs for power generation.

5. The operation method according to claim 4, wherein, when there is no tidal current velocity in the duct, the stator is successively connected to the power grid via the electrically-driving grid side switch, the frequency converter and the electromotor side switch to absorb the electric energy to generate an alternating magnetic field that interacts with the magnetic field generated by the rotor to drive the rotor to rotate; the rotor further drives the impeller to rotate; and the bidirectional tidal current power generation device operates as an electric water pump.

* * * * *